United States Patent
Pageau et al.

(10) Patent No.: US 6,232,610 B1
(45) Date of Patent: May 15, 2001

(54) DOSIMETRY APPARATUS AND METHOD

(75) Inventors: Gary M. Pageau, Englewood; Steve Kruger, Thornton, both of CO (US)

(73) Assignee: GEX Corporation, Englewood, CO (US)

(*) Notice: Subject to any disclaimer, the term of this patent is extended or adjusted under 35 U.S.C. 154(b) by 0 days.

(21) Appl. No.: 09/334,834

(22) Filed: Jun. 17, 1999

(51) Int. Cl.$^7$ .................................. G01J 1/50; G01J 1/02
(52) U.S. Cl. .................................. 250/474.1; 250/473.1; 250/484.3; 250/484.4
(58) Field of Search .................. 250/474.1, 473.1, 250/484.3, 484.4

(56) References Cited

U.S. PATENT DOCUMENTS

| | | |
|---|---|---|
| 5,084,623 * | 1/1992 | Lewis et al. ........... 250/474.1 |
| 5,206,118 | 4/1993 | Sidney et al. . |
| 5,396,074 | 3/1995 | Peck et al. . |
| 5,590,602 | 1/1997 | Peck et al. . |
| 5,637,876 | 6/1997 | Donahue et al. . |
| 5,777,341 | 7/1998 | Selwatz et al. . |
| 5,844,681 | 12/1998 | Alessi et al. . |

* cited by examiner

Primary Examiner—Constantine Hannaher
Assistant Examiner—Andrew Israel
(74) Attorney, Agent, or Firm—Marsh Fischmann & Breyfogle LLP

(57) ABSTRACT

A dosimeter analysis system provides the capability to easily handle the radiochromic pieces of film which are commonly employed as dosimeters and make an accurate analysis of the amount of radiation received in an irradiation process. The dosimeter is constructed through use of one or more layers of a material such as paper, cardboard or non-woven material between which a piece of radiochromic film may be positioned. Through at least one of the layers, an aperture is formed which provides for the direct viewing of the radiochromic film. This dosimeter card may then be placed in a dosimeter card holder and placed in an analysis device such as a spectrophotometer. Also included on the dosimeter card may be a unique marking which provides a reference to unique information pertaining to the piece of radiochromic film employed in the dosimeter card. Further, a system may be employed to access this information when the dosimeter card is being scanned and further employ this information to provide a more accurate or complete reading of the radiation dosage received by the dosimeter card.

35 Claims, 9 Drawing Sheets

DOSIMETRY APPARATUS AND METHOD

FIELD OF THE INVENTION

The present invention relates to a dosimeter and dosimeter system employed in an irradiation process, and more particularly to a dosimeter and related system which simplifies the handling and analyzing of dosimeters.

BACKGROUND OF THE INVENTION

Irradiation systems are used for irradiating articles, such as food stuffs, food utensils, medical devices, consumer goods, cosmetics, and waste products and their containers. The irradiation process employs high energy electromagnetic radiation, generated from radiation sources such as bremstralung x-ray beams, high energy electron beams, gamma rays, and microwaves, for the purpose of sterilizing such articles.

It is known to irradiate articles by utilizing a system that includes a radiation source and may include a conveyor for transporting the articles into and out of the radiation process field. Mounted on the article(s) or located in proximity to the article(s) being irradiated may be a number of dosimeters which are employed to measure the radiation doses or a dose related to the dose(s) which the article(s) has received from the radiation source.

The dosimeter may also comprise an individual piece of radiochromic film enclosed in an environmental container to protect the film from exposure to various environmental factors, such as ultraviolet radiation. Radiochromic films have the characteristic of changing color in a proportionate amount to the radiation absorbed. After the irradiation process is complete, the pieces of radiochromic film may be measured using a device which measures the change in transmissivity, absorption or reflectance of the film, which is indicative of the radiation dosage received.

SUMMARY OF THE INVENTION

The inventors have recognized that certain difficulties exist with handling and analyzing dosimeters employing radiochromic films. In particular, due to the small size of the pieces of radiochromic film employed, they may be difficult to handle. Also, exposure of the radiochromic film to foreign substances such as skin oil may adversely affect the performance of the film. Further, it is common for the radiochromic film pieces to be cut from larger sections of film. Because variations and aberrations may exist at different locations on these pieces, there may be differences in the performance of the individual dosimeters. These differences may include prior exposure of the sheets or individual dosimeters to radiation sources prior to the irradiation process, as well as differences in thicknesses of the film which relate to the rate of change of color of the dosimeter during exposure to radiation.

Described herein is a dosimeter and dosimeter analyzing system. The dosimeter may include a pre-cut piece of radiochromic film and at least one layer of supporting material to which the piece of radiochromic film may be affixed. The layer(s) may be constructed of materials such as paper with a known stiffness, or cardboard or non-woven spun synthetic fibers such as Tyvek™, a trademark of DuPont. Incorporated into one layer of the supporting layer may be an aperture through which the piece of radiochromic film may be viewable. The film may be attached to the first layer such that it adheres to the portions of the layer in proximity to the aperture. The combination of supporting material and film comprise a dosimeter card.

In one aspect of the invention, a second layer may be attached on the opposite side of the film from the first layer. This attachment is made such that the second layer is in contact with both the film and first layer. Based on the type of analysis performed, the second layer may or may not include an aperture.

The dosimeter card described above may be analyzed in a number of different modes with a variety of different instruments. According to one mode, The dosimeter card may be placed in a measuring instrument, such as a laser or scanner, and a light source may be employed to shine light on the film which is then reflected back to a sensing element. The sensing element may measure the intensity of the reflected light a/k/a the absorptive characteristics of the film. Based on this measurement, a radiation dosage for the device may be determined.

In another aspect of the invention, an additional aperture may be incorporated into the second layer of the dosimeter card. Because of the translucent nature of the film, when the dosimeter is placed in a measuring device such as a spectrophotometer, light may be transmitted through the film, and a sensing element on the opposite side of the dosimeter card from the light source may then measure the amount of light which passes through the film. Based on this measurement, the amount of radiation absorbed by the film may be determined.

In addition to the spectrophotometer, a number of other measuring devices may be employed to analyze the film. One instrument is a color or grayscale scanner of the type regularly employed with personal computers. A reflective scan may be performed of the radiochromic film in the dosimeter card, and once the color of the film has been identified, this may be compared against a value stored in a table in a computer memory. Another device which may be employed is a laser scanner. Laser light may be directed at the film and based on an analysis of the reflected light a radiation dosage for the film may be determined.

In yet another aspect of the invention, a unique marking may be included on the dosimeter card. The marking may act as identification for a data file which contains information about the piece of film in the dosimeter card. During the manufacture of the dosimeter cards, it may be advantageous to know in advance information about the radiochromic film. Such pieces of information may include the lot number for the roll, sheet or batch of film from which the piece was cut, the sheet number, and the portion of the sheet from which the piece of film was cut. This information may be relevant when used in conjunction with the analysis of the radiochromic film. For example, measurements of thickness may be taken for the sheets of film at various locations. Also, information may be acquired as to the exposure level of a sheet prior to the cutting out of dosimeter film pieces. At any point in the process, once the identification number for the dosimeter is known, this information may be accessed and used to generate a more accurate dosage reading.

In another aspect of the invention, the marking on the dosimeter card may be a scannable bar code. Prior to any analysis being performed of the dosimeter, the bar code can be scanned, and the scanned information may be used to access information about the dosimeter card. This stored information may be used during the analysis performed by the measuring instruments to provide a more accurate or more complete measure of the dose of radiation received by the film.

In yet another aspect of the invention, the material employed as the first and/or second layers in the dosimeter cards may be used as a calibration tool for the sensing devices. If the reflectance characteristics of the material are known, this may be used as a reference point during analysis of the dosimeter card. This may be especially advantageous in the situations where a scanner or laser device is employed.

The dosimeter system described herein may include a scanning device for directing light at the film in the dosimeter card, and either through a reflectance or transmissive analysis, measuring the amount of light absorbed by the film. The scanning device may be connected to a processing apparatus such as a personal computer which includes a central processing unit and a memory. The connection may be a direct electrical connection, or it may be established over a data network such as the Internet. The processing apparatus may include a processing module directed towards analyzing information gathered from the scanning device. Preloaded in the memory may be entries for each of the dosimeter cards employed during the irradiation process. Information stored in each entry may include specific data about the dosimeter. This information may relate to film thickness levels, as well as previous exposure of the film to irradiation. Other identifying information may also be included which helps track the use of the dosimeter card. Also connected to the processing apparatus may be user interface devices such as a computer display and keyboard and mouse which may be employed by a system user to view and manipulate data generated as a result of the analysis process.

In operation, during the construction of the dosimeter cards, as described above, a database is created which notes in particular certain features as to the pieces of film employed in the dosimeter cards. Upon completion of the construction of the cards, a unique code may be added to the dosimeter card which when scanned will facilitate the location of further information about the dosimeter card. The dosimeter card may then be packaged in an environmental enclosure in order to protect the card against exposure to environmental factors such as ultraviolet radiation.

After the dosimeter card has gone through the irradiation process, it may be removed from the environmental enclosure and the analysis begun. Before the analysis, the unique coding is read off the dosimeter card and the relevant information located and retrieved from the database. The card is then run through the analysis process and a reading is taken of the film in the dosimeter card. The retrieved information may then be used in conjunction with the information gathered during the analysis to formulate an accurate calculation of the radiation dosage.

In yet another aspect of the invention, instead of packaging the dosimeter cards in environmental containers, a laminate may be applied to the card which protects the film from various environmental factors including ultraviolet radiation. As such, the dosimeter cards may be directly applied to the object which is being irradiated without the environmental container, and once removed, can be analyzed in substantially the same fashion as described above.

DETAILED DESCRIPTION

Figure 1:
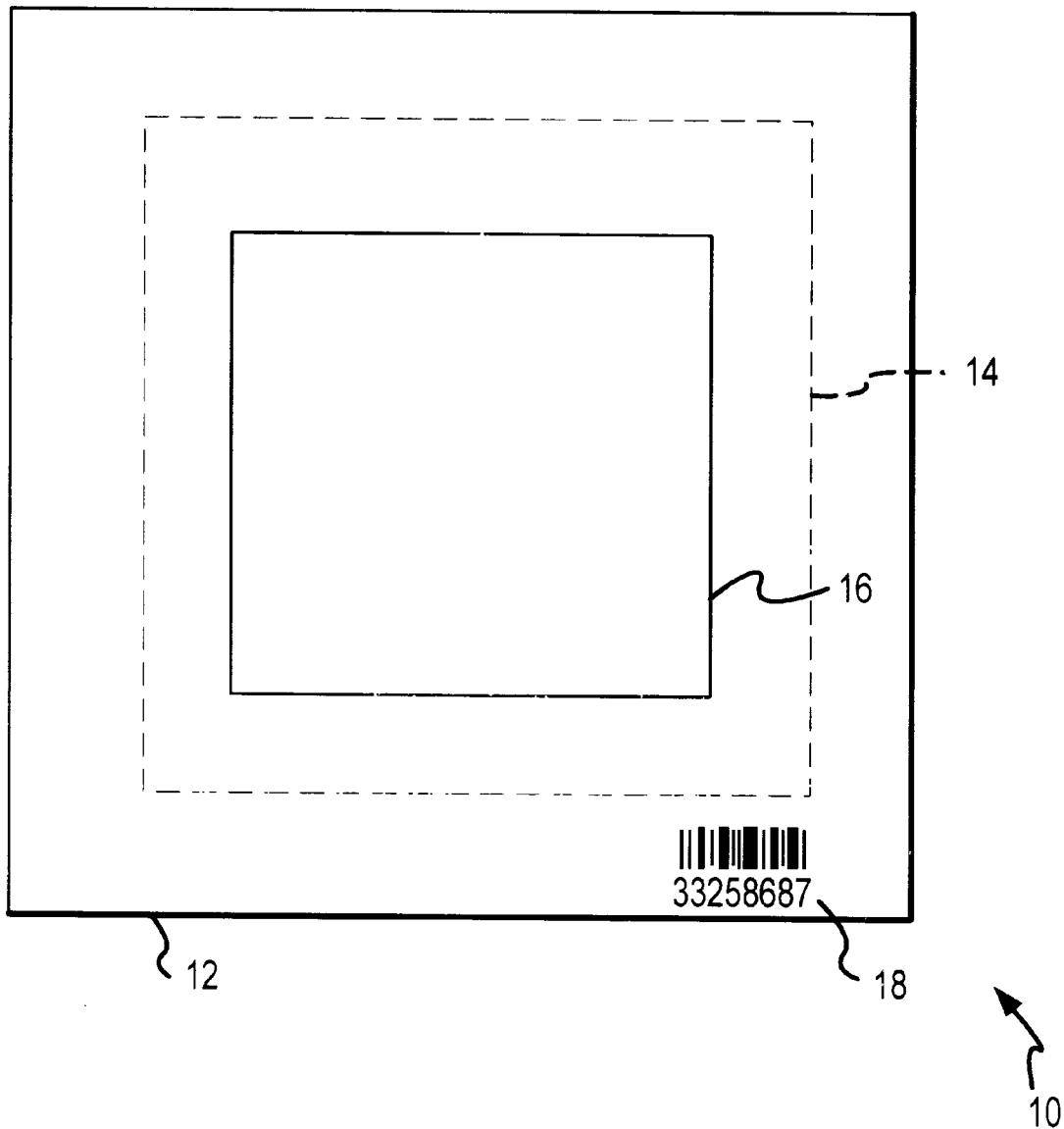
FIG. 1 discloses a front view of a dosimeter card.

Disclosed in FIG. 1 is a front view of a dosimeter card 10. Included as part of the dosimeter card is the dosimeter frame 12. This frame may be constructed of a number of different materials which may include paper of a desired stiffness, cardboard, Tyvek™, or any other material with the desired stiffness to perform the function for the dosimeter card. Incorporated into the frame is an aperture 16 may pass through all or a portion of the dosimeter card. The aperture 16 in the view shown in FIG. 1 is in a square or rectangular shape, however, one skilled in the art would know that the aperture may be in any desired shape which would facilitate the function of the device.

Viewable through the aperture is radiation-sensitive film (dosimeter) 14. This dosimeter may be of the radiochromic type. Embedded in the radiochromic film is a dye which turns darker or changes color as it is exposed to radiation. When exposed, the dye will go from a clear or transparent appearance to having a particular color. The darkness or intensity of the color is directly related to the amount of radiation received.

Also included on the dosimeter frame is identification marking 18. This marking is unique to the particular dosimeter card and may contain an identification code or reference information. The information or code may be employed to access a file in a computer system which contains further information relating to the dosimeter card. In one embodiment of the invention, the marking may be a bar code which when scanned provides a unique identifying code for the dosimeter card.

Figure 2:
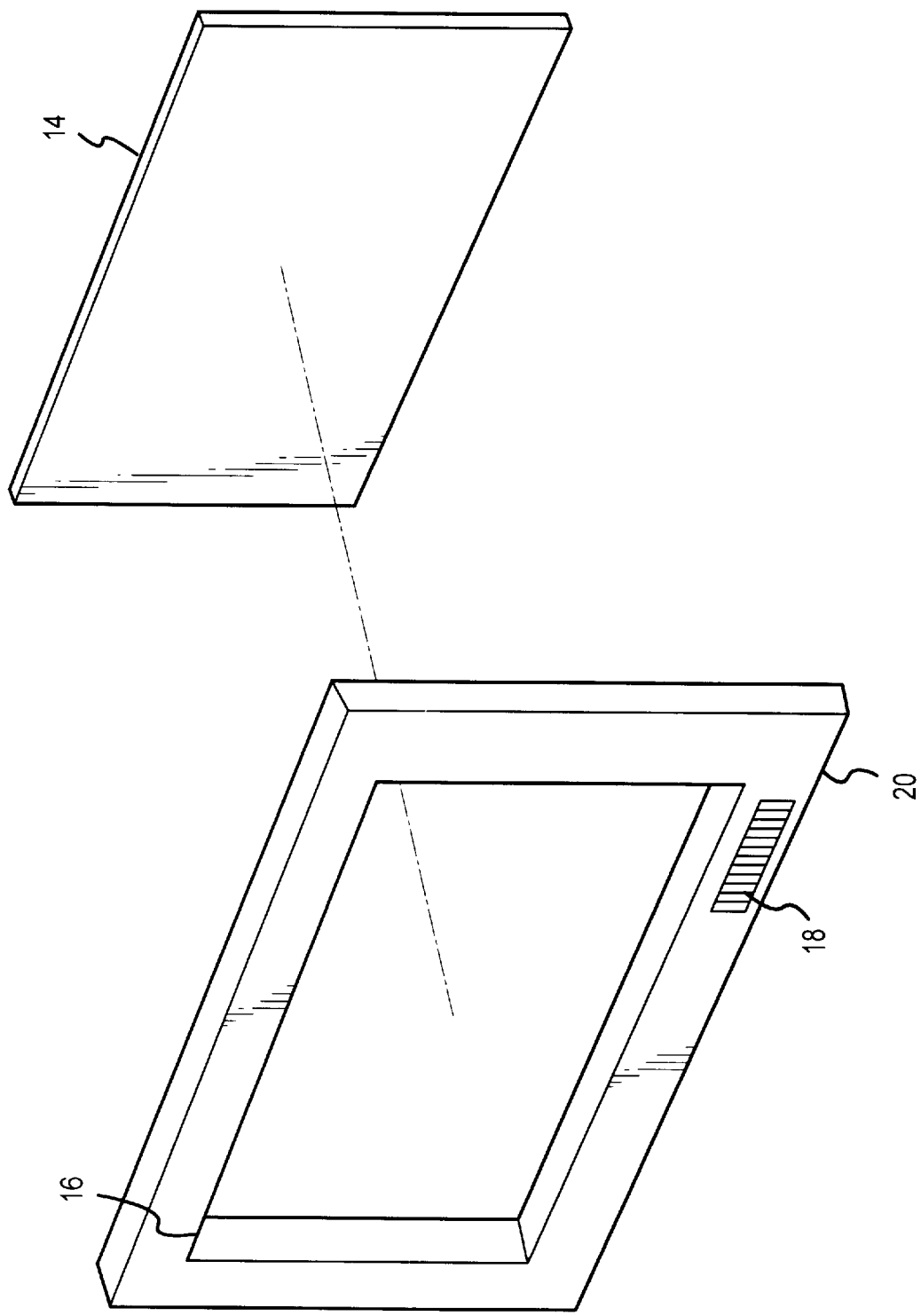
FIG. 2 discloses an exploded view of the first embodiment of the dosimeter card.

Disclosed in FIG. 2 is an exploded view of the dosimeter card 10. As can be seen, the frame comprises a front layer 20. During the assembly process, the dosimeter 14 is attached to the front layer 20 by attaching the edges of the film piece around the periphery of the aperture 16. This attachment may be made through any number of known industrial adhesives or bonding techniques. Once the dosimeter is attached to the first layer 20, the dosimeter card is ready to be used.

Figure 3A:
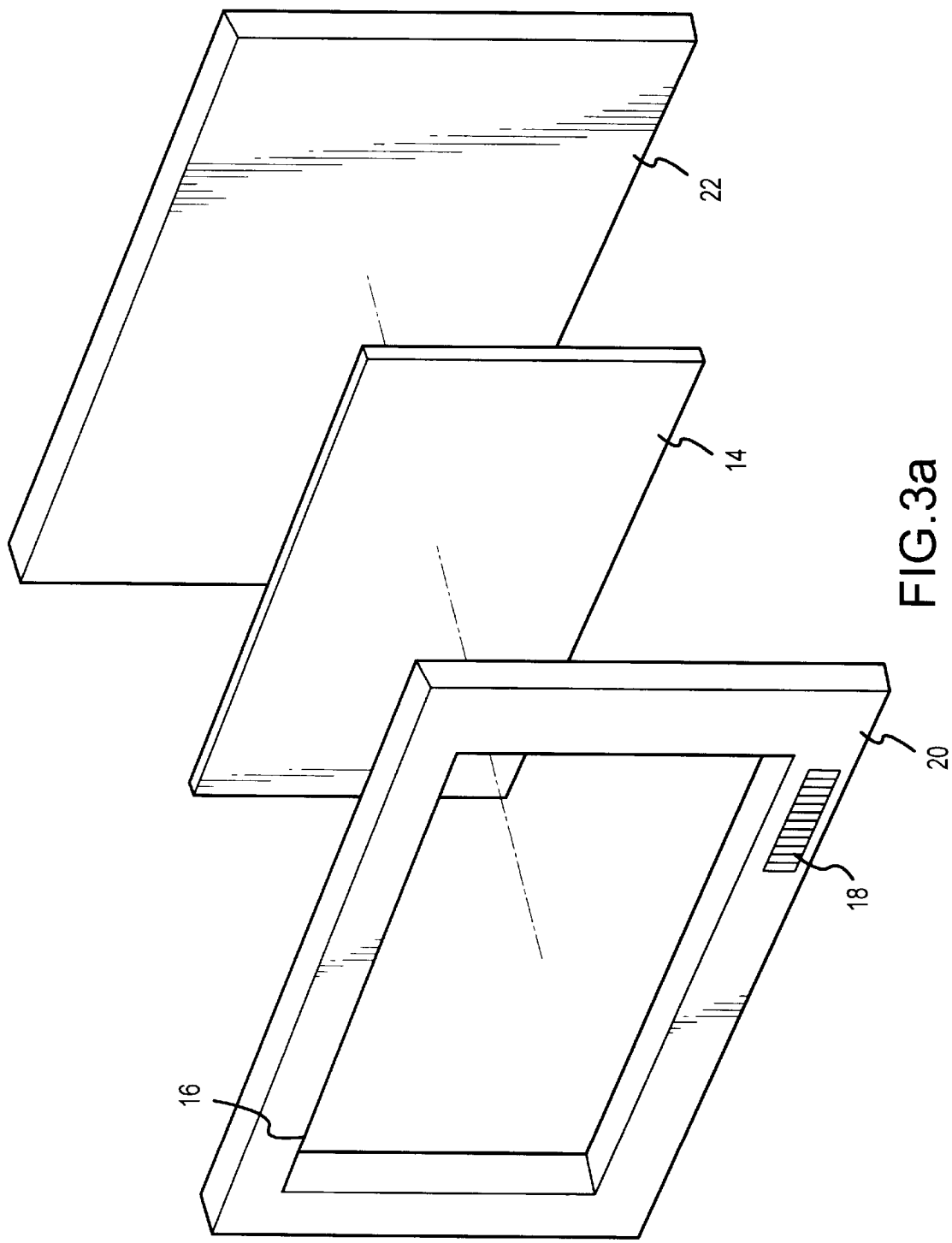
FIGS. 3a and b disclose an exploded view of a second embodiment of the dosimeter card.
Figure 3B:
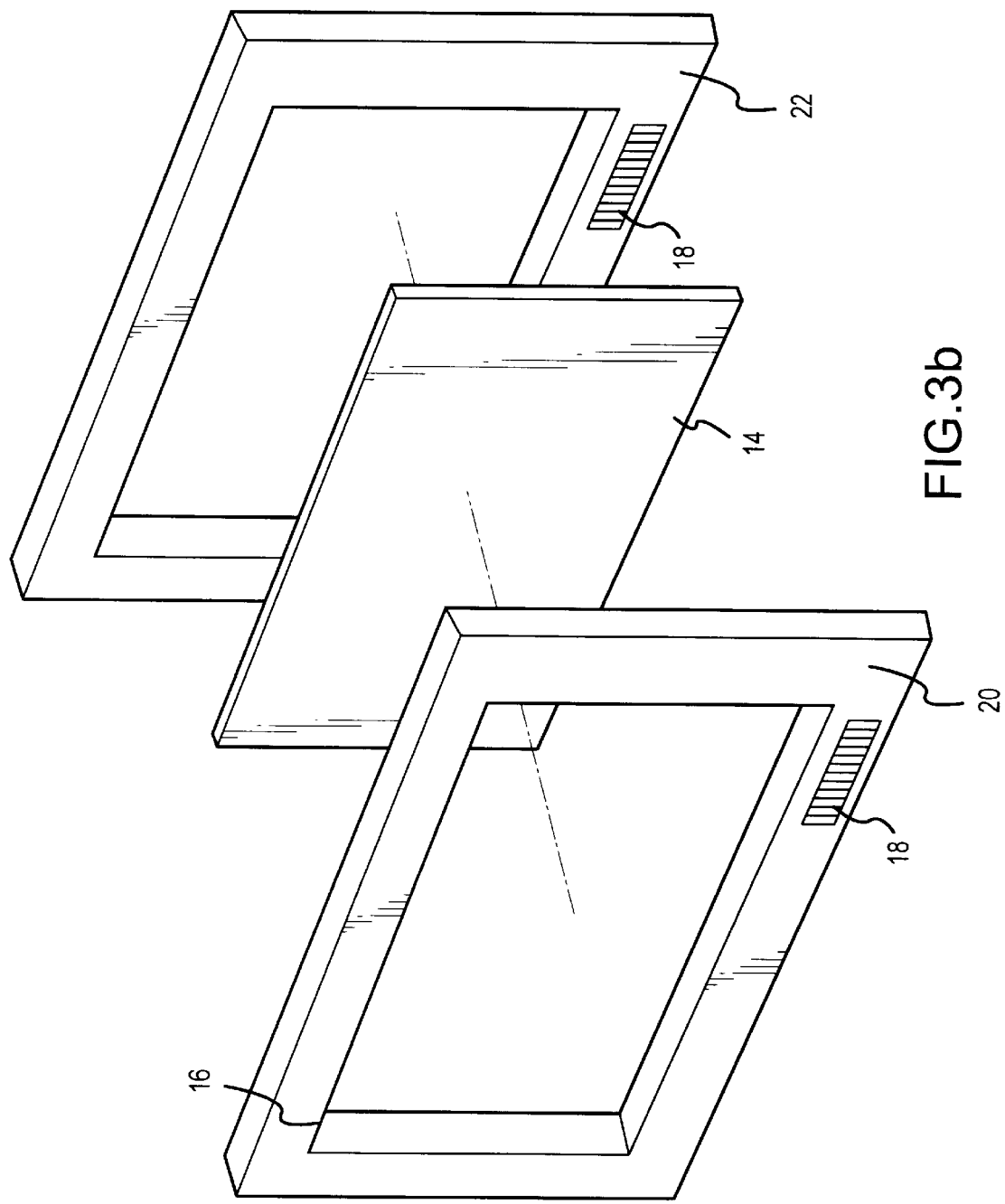

Disclosed in FIGS. 3a and b are a second embodiment of the dosimeter card. In this embodiment a second layer 22 may be adhesively attached to the first layer 20 trapping the dosimeter patch between the two layers. This second layer, or backing may be employed in the instances when reflective analysis is performed on the dosimeter. Alternatively, an aperture 24 may be included in the second layer 22, as is shown is FIG. 3b. This may be included when a transmissive analysis is performed of the dosimeter.

The dosimeter card 10 provides the advantage that the dosimeters are now easier to handle and analyze. One of the characteristics of radiochromic films is that their performance is degraded by contact with a foreign substance such as skin oil. Another significant factor is that the films are typically very thin and the pieces are often cut in very small portions. For example, a sheet of radiochromic film is typically cut up into one centimeter by one centimeter pieces. The small size compounded with the thinness of film make the dosimeters difficult to handle. The frame provides the ability to easily handle the dosimeters of any size, without having to come in direct contact with the film material itself. In situations where larger strips or pieces of the radiochromic film are used, the frame allows for easier handling of the film without having to physically touch it, or employ special instruments.

Common packaging process employed for dosimeters is to place them in an environmental package such as an envelope or some kind of metallic or foil pouch. This is done to protect the film from exposure to ultraviolet radiation and other environmental factors that may affect the measurements. The envelopes containing the dosimeters are then attached to the object which is to be irradiated. After this process is performed, the dosimeters are removed from the envelopes and analyzed. The frame described above simplifies the process of handling the film during packaging the dosimeters, and then once the irradiation process is performed, moving the dosimeter to an instrument which will be employed to analyze the film. The cards may be easily handled with tweezers or other similar device to move the dosimeter cards from location to location.

Figure 4:
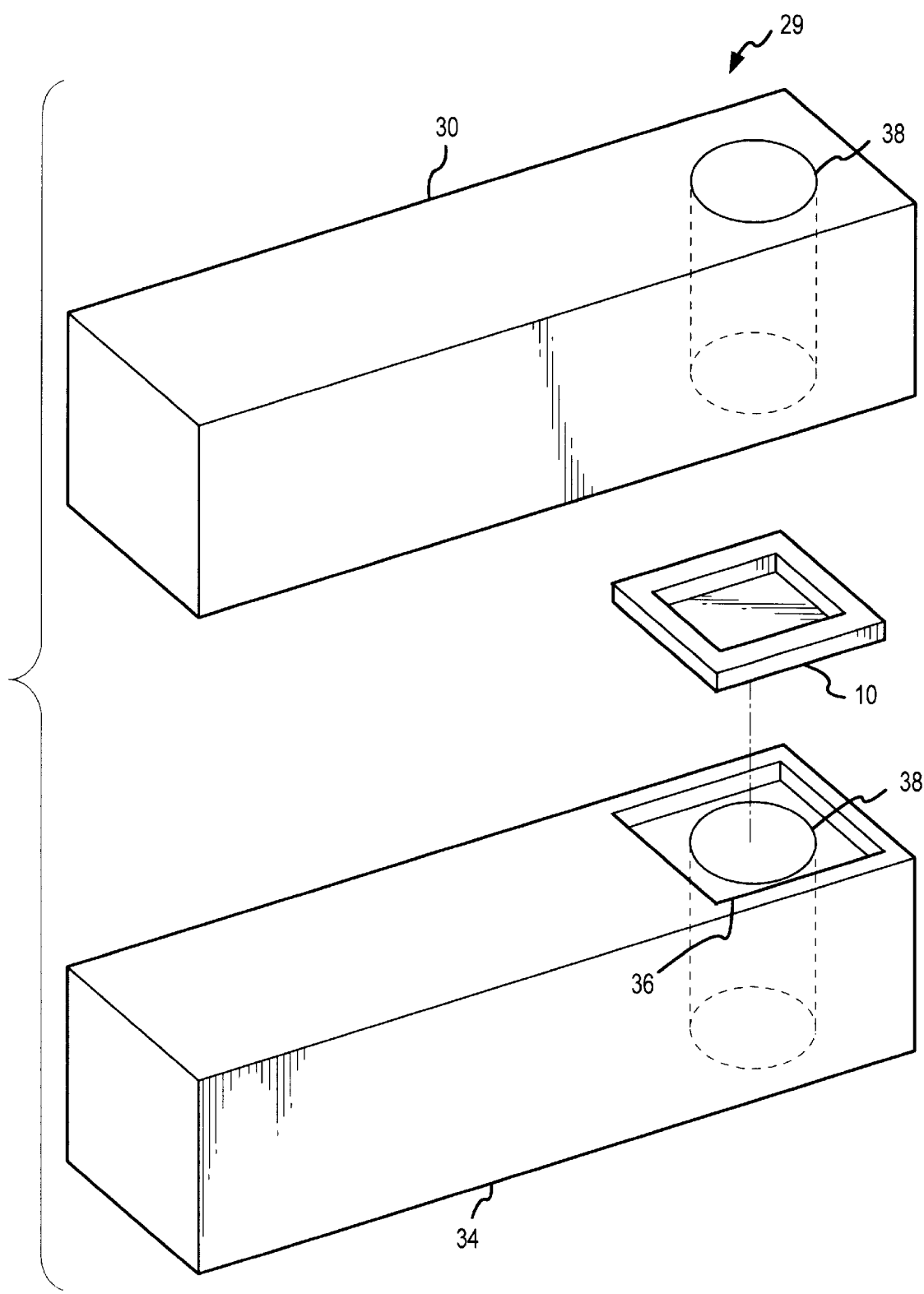
FIG. 4 discloses an exploded view of a dosimeter card and a dosimeter cardholder.

Disclosed in FIG. 4, is a holder for the dosimeter cards when performing an analysis of the radiochromic film. The holder is comprised of two pieces 30 and 34. Piece 34 includes a cavity for positioning the dosimeter card 10. Extending into the cavity 36 in piece 34 is an aperture 38. Through this aperture, the dosimeter in dosimeter card 10 is viewable. Depending on the type of measurement being made, the holder piece 30 may also include an aperture 32 for allowing light to pass through the holder and the dosimeter card 10. Once the dosimeter card is in the cavity, the two pieces of the holder may be connected together and the analysis process may be begun.

A device commonly employed for analyzing and determining doses is a spectrophotometer. In this device, a light source directs light onto the radiochromic film and light allowed to be transmitted through the film, the absorptive characteristics of the dosimeter may can be determined. The amount of light absorbed by the dosimeter during the analysis is proportional to the radiation dosage received.

Figure 5:
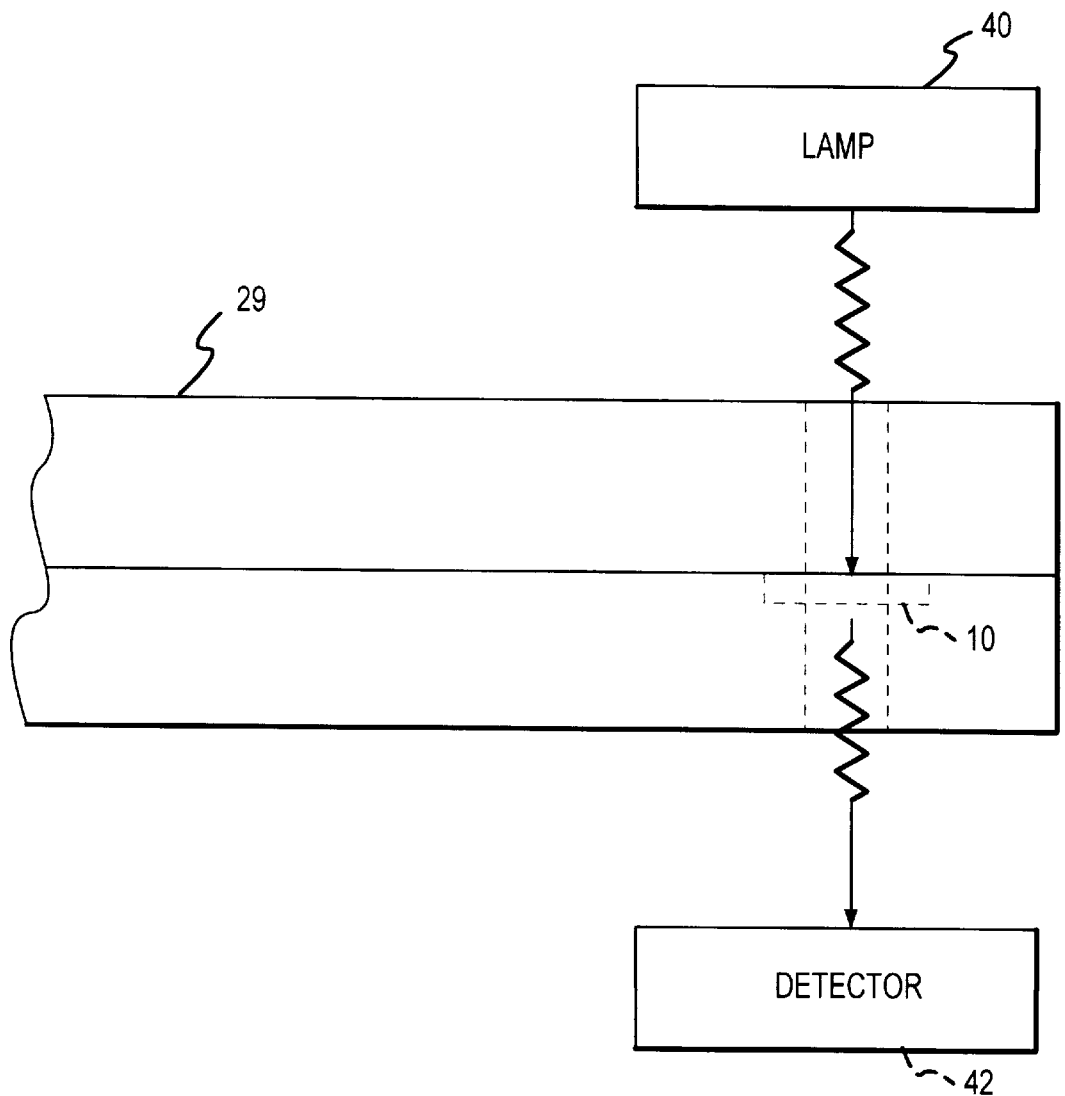
FIG. 5 disclose a side view of a dosimeter card and dosimeter holder within a spectrophotometer.

Disclosed in FIG. 5 is a configuration for the spectrophotometer in which the transmissive method of analysis is employed. In this situation, the dosimeter card and holder as disclosed in FIG. 3, is employed. As can be seen, a light source 40 provides the light for illuminating the dosimeter and the detector 42, positioned opposite the holder 29 from light source 40 receives any light which is transmitted through the dosimeter. Based on the amount of light allowed to pass, a radiation dosage determination may be made.

Figure 6:
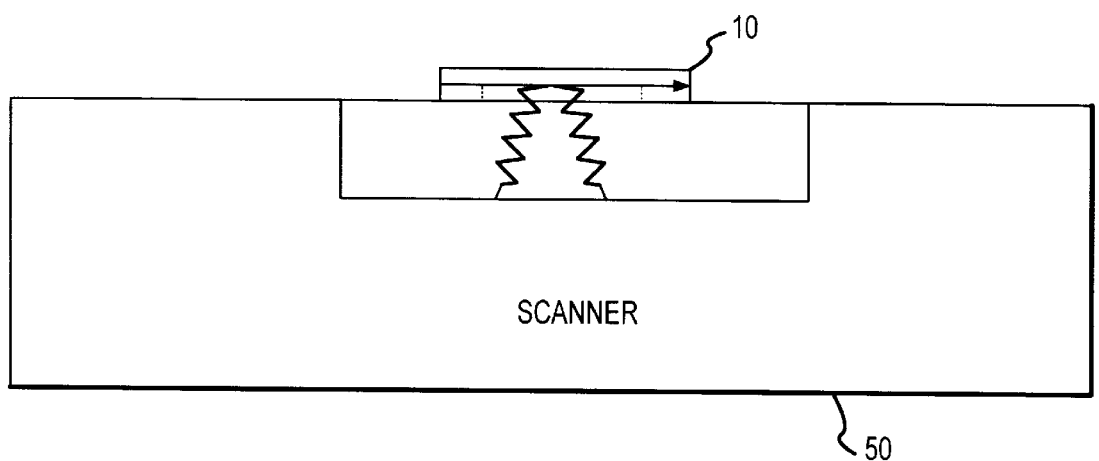
FIG. 6 discloses a dosimeter card being analyzed by an electronic scanner.

Disclosed in FIG. 6 is another embodiment for analyzing dosimeter cards. In this system, a scanner device with a connection to a personal computer may be employed. Any hand-held or flatbed scanner with the appropriate software may be employed for this purpose. In the example shown in FIG. 6, a flatbed scanner is employed to make the analysis. Incorporated into the scanner 50 is a light source 51 which emits light which passes through the aperture in the first layer of the dosimeter card. In this case, the first embodiment of the dosimeter card is employed where there is no aperture in the second layer. In order to perform the analysis, the dosimeter card is positioned proximate to the light source. Light is reflected off the dosimeter and reflected into the sensing element. Based on the amount of reflected light received, a radiation dosage for the radiochromic film may be determined.

Figure 7:
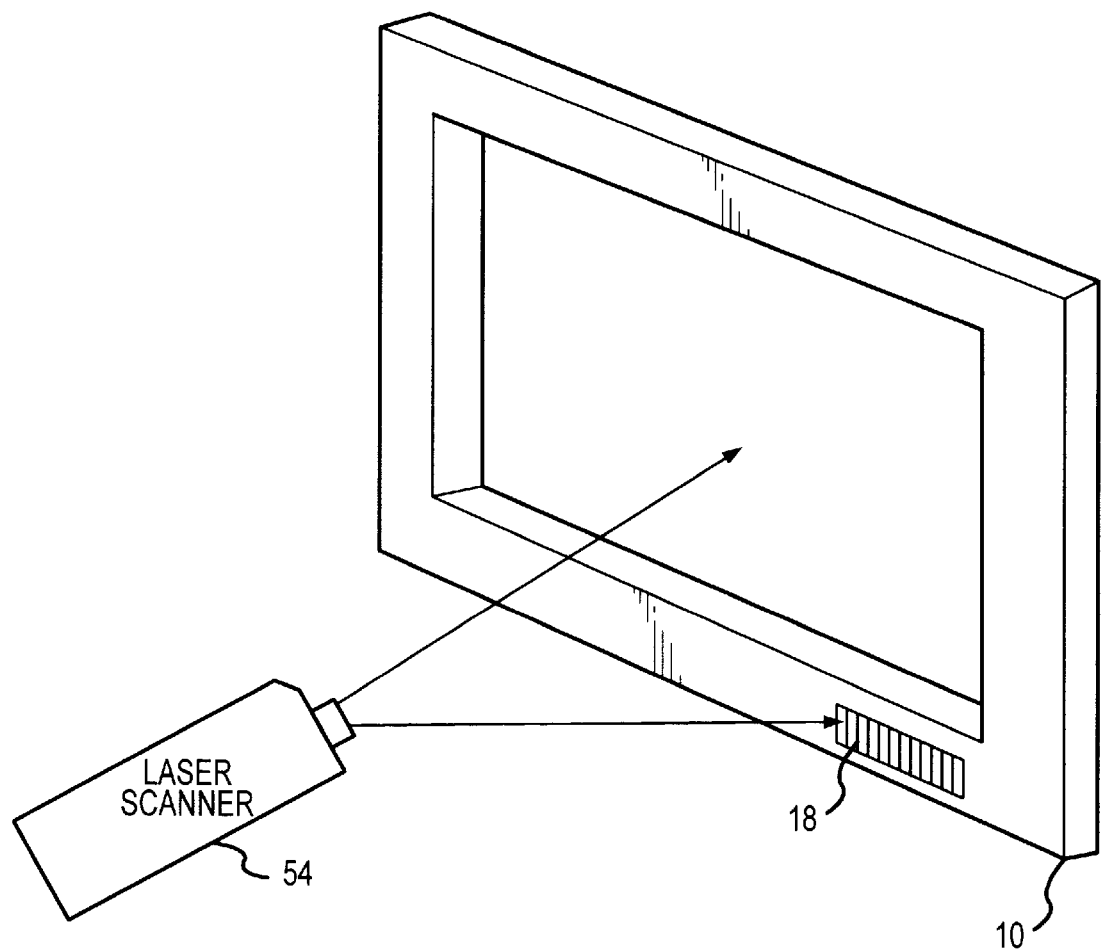
FIG. 7 discloses a dosimeter card with bar code being analyzed through use of a laser scanner.

Disclosed in FIG. 7 is yet another embodiment for analyzing the dosimeter card. In this embodiment, a laser scanner 54 is employed to reflect laser light off the radiochromic film and based on the received reflections, determine a dosage level for the dosimeter. An advantage of employing a laser scanner for this purpose is that it may serve a dual purpose. As is well known, laser scanners are used to scan bar codes in order to extract unique information for the item being scanned. In the embodiment disclosed herein, prior to scanning the radiochromic film, the laser scanner may first scan the bar code printed on the dosimeter card frame. Once the information has been identified, the appropriate entry in a database may be accessed and the information retrieved for the analysis purposes.

With regards to the use of either the scanner or laser for performing the analysis, the first and second layers of the dosimeter card may be constructed of a material which reflects light at a known wave length. Prior to making an analysis of the radiochromic film, the scanner may scan a portion of the frame of the dosimeter card in order to provide a calibration value for performing analysis. Once this reference value is established, scans of the dosimeter may be compared against this and a radiation dosage for the dosimeter card may be determined.

As was described above, certain characteristics of the radiochromic film may affect the accuracy of the analysis of the radiochromic film. In constructing the dosimeter cards, the film which is employed comes from mass-produced sheets which do not all have the same characteristics. For example, some sheets may have had exposure to other sources of radiation, such as ultraviolet, and as such, have been slightly exposed. Also, the thickness incorporated in the sheets may vary from location to location. The thicknesses may vary to the extent that it affects the rate of change of the dosimeter with regard to a similarly manufactured dosimeter card.

Prior to the cutting and the placement of the radiochromic film pieces in a dosimeter card, certain processes are performed to identify and determine a current state for the particular film piece. One example may be that for each piece cut from a film sheet, the lot number and location of the piece on the sheet is identified as well as the current exposure level. This information may then be stored as an entry in a database. When a dosimeter card is constructed, a unique marking may be placed on the card to facilitate the accessing of unique information contained in the database relating to the dosimeter. The information stored in the database may then be employed during the analysis process to provide an accurate dosage measurement.

Figure 8:
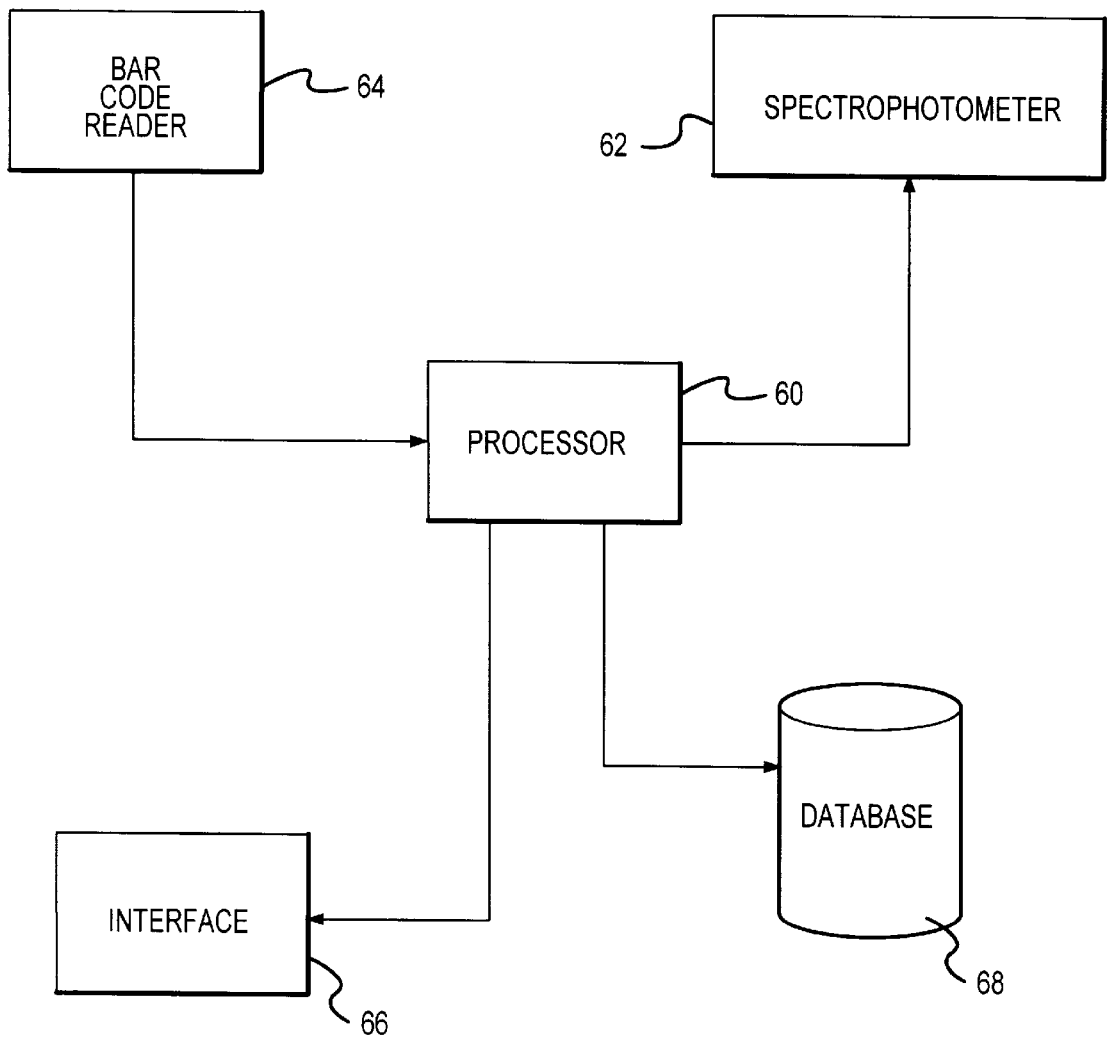
FIG. 8 discloses a system for reading and providing an analysis of dosimeter cards.

Disclosed in FIG. 8 is a system which may be employed to perform the analysis of the dosimeter cards described above. The processor 60 directs the functions of all the major components in the system. In one embodiment of the invention, this processor may be the central processing unit or Internet based software of a personal computer which includes a specially adapted processing module for performing the functions described herein. In connection with the processor is the spectrophotometer 62 which performs the analysis of the dosimeter cards as described above. As was also mentioned above, other devices such as scanners and laser scanners, may be employed to perform these same functions. The connections between components may be direct connections, or the connections may be established through use of a data network such as the Internet.

Also in connection with the processor 60 is the bar code reader 64. This bar code reader may be of the type generally known in the art today which further includes the capability to scan bar codes which are small enough to be printed on the frame of a dosimeter card. Also in connection with the processor 60 is the database 68, which includes all the information generated about the dosimeter cards during the manufacturing process. The processor may further include the capability to update entries included in the database. Finally, also in connection with the processor, is a user interface, which may be a computer display and keyboard and mouse which a computer operator may employ to manipulate data provided by the processor 60 which is displayed on the computer display.

In operation, as was mentioned above, during the production process for the dosimeter cards, the information for each piece of radiochromic film is stored in an entry in the database 68. The dosimeter card may then be enclosed in the environmental packaging or left exposed. The dosimeter is then attached to an object for which the radiation measurement is being made. Upon completion of the radiation process, the dosimeter card may be removed from the environmental packaging if used, and as a first step, the bar code reader 64 scans the bar code on the dosimeter frame. In situations where more than one card is being analyzed at once, further information may also be entered as to the location of a particular card in the analysis device, a.k.a. spectrophotometer. With this information gathered, the analysis of the dosimeter cards may then be performed.

As was described above, while in the spectrophotometer, light may be transmitted through the dosimeter and based on the analysis of the light, the absorptive characteristics of the radiochromic film may be determined. With this absorption value known, this value may be provided to processor 60 which then retrieves a table in database 68 which provides a corresponding radiation dosage value for the reading taken of the dosimeter.

Because each dosimeter card may have a unique characteristics value and may react in a different way to exposure to radiation, the specific information relating to the dosimeter card being analyzed is also retrieved from memory. Once the light absorption characteristic for the radiochromic film has been determined, this value may be adjusted through use of the unique information stored in memory. For example, if it is found in the unique information that the radiochromic film had already received a certain level of exposure prior to its being packaged, this may act as a zero or reference point in order to determine the exposure amount. Further, if the thickness of a dosimeter film is known, it may then also be determined what the change of color per unit thickness for the piece dosimeter is. Through use of these values, an accurate analysis may be made of the dosimeter card in order to determine the amount of radiation received. This information may then be provided to a system user through the user interface 66.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A radiation dosimeter apparatus comprising:

a first layer of support material with first and second sides where the first layer includes a first viewing aperture which passes therethrough;

a precut piece of radiation sensitive film fixably attached to the second side of the first layer and is viewable through the aperture from the first side of the first layer; and wherein the first layer is configured for mounting in a measurement device wherein absorptive characteristics of the film are measurable through transmission of light through the film from a first direction and measurement of light transmitted through the film from a second direction, substantially opposite the first direction.

2. The apparatus of claim 1 further including a second layer of support material with first and second sides where the first side of the second layer is in contact with the second side of the first layer and the film is positioned between the first and second layers.

3. The apparatus claim 2 wherein the second layer includes a second viewing aperture through which the film is viewable from the second side of the second layer.

4. The apparatus of claim 1 wherein an informational marking is included on the first layer, which relates to information about the film.

5. The apparatus of claim 4 wherein the informational marking is a bar code.

6. The apparatus of claim 4 wherein the informational marking corresponds to a an entry in a database.

7. The apparatus of claim 6 wherein the entry contains at least one of: the source of the film, the location of the piece of film on a particular sheet film or Batch ID# of the film, a reference value for the exposure of the film, and identification number for the piece of film.

8. The apparatus of claim 1 wherein a dosimeter is used to measure radiation exposure.

9. The apparatus of claim 1 wherein spectrophotometer is employed to measure the absorptive characteristics of the film.

10. The apparatus of claim 2 wherein the absorptive characteristics of the film are measured using a reflective system.

11. The apparatus of claim 1 wherein a electronic scanner is employed to measure the exposure level of the film.

12. The apparatus of claim 11 wherein the first layer reflects light of a know wavelength which may be used to calibrate the electronic scanner.

13. A system for measuring exposure to radiation doses comprising:

a dosimeter apparatus holder which includes at least one cavity formed therein wherein the holder further includes at least one aperture formed therein for viewing a dosimeter apparatus which may be positioned in the cavity; and a measuring device employable for determining absorptive characteristics of a radiochromic film strip included in the dosimeter apparatus;

a scanning device which identifies the unique marking included on the dosimeter apparatus, and based on the identified unique marking accesses a database and retrieves information relating to the dosimeter apparatus.

14. The system of claim 13 wherein the holder may include first and second apertures at opposite sides of the cavity through which the cavity is viewable, and the dosimeter apparatus positionable in the cavity may comprise:

a first layer of support material with first and second sides where the first layer includes a first viewing aperture which passes therethrough; and the radiochromic film strip positioned such that it is in contact with the second side of the first layer and is viewable through the aperture from the first side of the first layer.

15. The system of claim 13 wherein the holder may include a single aperture through which the cavity is viewable, and the dosimeter apparatus positionable in the cavity may comprise:

a first layer of support material with first and second sides where the first layer includes a first viewing aperture which passes therethrough; and a second layer of support material with first and second sides where the first side of the second layer is in contact with the second side of the first layer and the film strip is positioned between the first and second layers.

16. The system of claim 14 further comprising a second layer of support material with first and second sides where the first side of the second layer is in contact with the second side of the first layer and the film strip is positioned between the first and second layers, wherein an additional aperture is positioned in the second layer to provide for transmissive measurement of the dosimeter.

17. The system of claim 14 wherein the measuring device is a spectrophotometer.

18. The system of claim 16 wherein the measuring device is a PC scanner.

19. The system of claim 18 wherein the first of the dosimeter are constructed of a material which reflects light of a known wavelength for calibrating the measuring device.

20. The system of claim 13 wherein entries in the database include information relating to the source of the film, manufacturing batch information, a reference value film background and film thickness for the exposure of the film, and identification number for the piece of film.

21. The system of claim 13 wherein the unique marking is a bar code.

22. The system of claim 13 wherein the dosimeter further includes a laminate to protect the dosimeter against exposure to ultraviolet radiation.

23. A method for measuring exposure to radiation comprising:

fixably attaching a piece of radiation sensitive film to a first layer of support material, wherein the first layer of support material includes a first aperture through which the piece of radiation sensitive film is viewable and the radiation sensitive film and first layer comprise a dosimeter device;

providing a unique marking on the first layer which is associated with the piece of radiation sensitive film wherein the unique marking corresponds to a database entry which includes descriptive information with regards to the piece of radiation sensitive film;

exposing the dosimeter device to a radiation source;

identifying the unique mark on the holder and retrieving the descriptive information for the piece of radiation sensitive film; and measuring the absorptive characteristics in the film through transmissive testing and further employing the descriptive information to determine a radiation dosage absorbed by the film.

24. The method of claim 23 wherein the dosimeter device further includes a second layer of support material with first and second sides and a second aperture which passes therethrough, where the first side of the second layer is in contact with the second side of the first layer and the film is positioned between the first and second layers such that it s viewable thought the first and second apertures.

25. The method of claim 23 wherein the unique marking is a bar code.

26. The method of claim 23 wherein the step of measuring is performed by determining the reflective characteristics of the film.

27. The method of claim 23 wherein the database entry includes information relating to at least one of: the source of the film, the location of the piece of film on a particular sheet of the film, a reference value for the exposure of the film, and identification number for the piece of film.

28. The method of claim 23 wherein the film is radiochromic film.

29. A radiation dosimeter apparatus comprising:

a first layer of support material with first and second sides where the first layer includes a first viewing aperture which passes therethrough;

a second layer of support material with first and second sides and a second viewing aperture which passes therethrough; and a precut piece of radiation sensitive film positioned between the first and second layers such that it is in contact with the second side of the first layer and the first side of the second layer and is viewable through the first and second apertures.

30. The apparatus of claim 29 wherein the first and second layers are sized and configured for mounting in a measurement device wherein absorptive characteristics of the film is measurable through transmission of light through the film from a first direction and measurement of light transmitted through the film from a second direction, substantially opposite the first direction.

31. The apparatus of claim 30 wherein spectrophotometer is employed to measure the exposure level of the film.

32. The apparatus of claim 29 wherein an informational marking is included on at least one of: the first and second layer, which relates to information about the film.

33. The apparatus of claim 32 wherein the informational marking is a bar code.

34. The apparatus of claim 32 wherein the informational marking corresponds to a an entry in a database.

35. The apparatus of claim 34 wherein the entry contains at least one of: the source of the film, the location of the piece of film on a particular sheet film or Batch ID# of the film, a reference value for the exposure of the film, and identification number for the piece of film.

* * * * *